United States Patent
Stango et al.

(10) Patent No.: US 7,444,078 B1
(45) Date of Patent: Oct. 28, 2008

(54) TRANSIENT CONTROL SOLUTION FOR OPTICAL NETWORKS

(75) Inventors: Joseph T. Stango, Manalapan, NJ (US); Guodong Zhang, Manalapan, NJ (US)

(73) Assignee: AT&T Intellectual Property II, L.P., Reno, NV (US)

(*) Notice: Subject to any disclaimer, the term of this patent is extended or adjusted under 35 U.S.C. 154(b) by 940 days.

(21) Appl. No.: 10/803,062

(22) Filed: Mar. 17, 2004

Related U.S. Application Data

(60) Provisional application No. 60/503,959, filed on Sep. 18, 2003.

(51) Int. Cl.
*H04J 14/02* (2006.01)

(52) U.S. Cl. .............................. 398/79; 398/18; 398/83; 398/92; 398/97; 398/173; 398/177; 359/334; 359/337.13

(58) Field of Classification Search ............... 398/82, 398/92, 97, 157–158, 173, 177, 18, 79, 83, 398/160; 359/337.12, 334, 337.13
See application file for complete search history.

(56) References Cited

U.S. PATENT DOCUMENTS

| | | | | |
|---|---|---|---|---|
| 5,926,590 | A * | 7/1999 | Mao | 385/24 |
| 6,011,623 | A * | 1/2000 | MacDonald et al. | 356/519 |
| 6,341,034 | B1 | 1/2002 | Sun et al. | |
| 6,356,386 | B1 | 3/2002 | Denkin et al. | |
| 6,414,788 | B1 | 7/2002 | Ye et al. | |
| 6,476,961 | B1 | 11/2002 | Ye et al. | |
| 6,498,677 | B1 | 12/2002 | Sun et al. | |
| 6,515,777 | B1 * | 2/2003 | Arnold et al. | 398/97 |
| 6,542,287 | B1 | 4/2003 | Ye et al. | |
| 6,639,716 | B1 * | 10/2003 | Tomofuji | 359/337.12 |
| 6,654,516 | B2 * | 11/2003 | So | 385/27 |
| 6,681,079 | B1 * | 1/2004 | Maroney | 398/15 |
| 7,061,666 | B2 * | 6/2006 | Inagaki et al. | 359/337.4 |
| 7,197,245 | B1 * | 3/2007 | Islam et al. | 398/82 |

(Continued)

OTHER PUBLICATIONS

J. Lehr Jackel, et al., "All-optical Stabilization of Cascaded Multichannel Erbium-Doped Fiber Amplifiers with Changing Numbers of Channels", OFC '97 Technical Digest, TuP4.

(Continued)

*Primary Examiner*—Kenneth Vanderpuye
*Assistant Examiner*—Phyowai Lin
(74) *Attorney, Agent, or Firm*—Hoffmann & Baron, LLP

(57) ABSTRACT

An optically amplified wavelength division multiplexing network has the functionality to add/drop channels at the optical add/drop multiplexing (OADM) nodes. The OADM node includes a receiver amplifier, an OADM module, and a transmitter amplifier. Once the OADM node detects a loss of signal (LOS) due to a fiber cut or network element failure upstream, the receiver amplifier is kept in operation as a noise source. The output of the receiver amplifier is immediately raised by increasing pump power to compensate for the LOS. The noise power received at the transmitter amplifier from the receiver amplifier is substantially equal to the signal power expected before LOS. The transient effect of downstream optical amplifiers is therefore completely suppressed and the inter-channel stimulated Raman scattering (SRS) induced spectrum tilt does not change. After the noise power is raised, the receiver amplifier may be shut down at a speed much slower than the speed of downstream amplifier control circuitry.

28 Claims, 3 Drawing Sheets

U.S. PATENT DOCUMENTS

| | | | |
|---|---|---|---|
| 2002/0114060 A1* | 8/2002 | Kobayashi et al. | 359/334 |
| 2003/0035206 A1* | 2/2003 | Pavel et al. | 359/341.4 |
| 2003/0090758 A1* | 5/2003 | Sparks et al. | 359/117 |
| 2003/0147126 A1* | 8/2003 | Rapp | 359/341.41 |
| 2004/0085621 A1* | 5/2004 | Sekiya | 359/334 |
| 2004/0208567 A1* | 10/2004 | Okano et al. | 398/79 |

OTHER PUBLICATIONS

E. Desurvire, et al., "Dynamic Gain Compensation in Saturated Erbium-Doped Fiber Amplifiers", IEEE Photonics Tech. Letters, vol. 3, No. 5, pp. 453-455 (May 1991).

G. Luo, et al., "Relaxation Oscillations and Spectral Hole Burning in Laser Automatic Gain Control of EDFAs", OFC '97 Technical Digest, WF4.

A.K. Srivastava, et al., "Fast-Link Control Protection of Surviving Channels in Multiwavelength Optical Networks", IEEE Photonics Tech. Letters, vol. 9, No. 12, pp. 1667-1669 (Dec. 1997).

* cited by examiner

TRANSIENT CONTROL SOLUTION FOR OPTICAL NETWORKS

CROSS-REFERENCE TO RELATED APPLICATION

This application claims the benefit of U.S. Provisional Application Ser. No. 60/503,959, filed on Sep. 18, 2003, which is incorporated herein by reference.

FIELD OF THE INVENTION

The invention relates to the field of high-speed optical telecommunication networks, and more particularly to a method and apparatus for suppressing the transient effect in surviving optical channels in the event of a fiber cut or network node failure.

BACKGROUND OF THE INVENTION

In optical telecommunication networks that use wavelength division multiplexing (WDM), multiple optical channels are carried on a single optical fiber. The single optical fiber is included in an optical fiber link, which includes the optical fiber and optical amplifiers and any other optical components between two connecting points or nodes along an optical transmission line. Each channel operates at a different wavelength in the optical fiber. New channels may be added and existing channels dropped in a node using an optical add/drop multiplexing (OADM) module.

Optical amplifiers are used to amplify WDM signals which are transmitted in a long (up to a few thousands of kilometers) optical fiber link. These amplifiers are used both in-line and at the transmitting and receiving end of an optical fiber link. In particular, erbium-doped fiber amplifiers (EDFAs) have become a well-accepted key enabler of WDM optical communication networks. The gain dynamics of EDFAs are generally considered to be slow in comparison to other gain media, and are a result of the long spontaneous lifetime of excited erbium ions (about 10 ms). For transmission of high-speed data, the gain of an EDFA is advantageously undisturbed by the signal modulation. The slow gain dynamics, however, also result in a slow response time. In the presence of a large instantaneous change in input power to the EDFA, the slow response time can cause adverse effects downstream.

For example, in optical networks with an optical add/drop multiplexing (OADM) module associated with each optical fiber link, the total input power to the optical amplifiers in the optical fiber link downstream of the OADM may fluctuate considerably due to changes in the number of channels in the network. This change in total input power induces gain fluctuations in the downstream optical amplifiers. Therefore, some kind of gain stabilization method is commonly used to keep gain constant in the optical amplifier while the input optical power fluctuates. During the gain stabilization process, the channels amplified by the optical amplifier may experience a much different gain from that before the input power change. This process is referred to as a transient effect.

In an extreme case, a fiber cut or equipment failure upstream from the OADM may occur, causing a transient effect on the transmission of surviving channels in the downstream link, i.e., in those channels added at the OADM. Due to the transient effect, the surviving channels may also experience transmission errors and, if severe enough, these errors may cause unwanted protection switching in optical networks. Protection switching is an automatic recovery feature for fiber or node failure, which functions by wrapping data traffic onto an alternate fiber link or switching the data in a failed channel to another channel.

One common solution to achieve stabilization of gain in the optical amplifiers is to integrate an automatic gain control (AGC) loop in the amplifier circuitry. Typically, gain is monitored by detecting optical power in and optical power out of an optical amplifier using optical taps before and after a gain stage. The actual gain is then calculated as the ratio of power out to power in. Adjustments to the actual gain by adjusting amplifier parameters to maintain a preferred operating gain of the optical amplifier can then be made in a feedback loop.

As an example of an optical amplifier, an EDFA is an optical fiber with a fiber core material doped with Erbium rare earth ions. Optical gain in an EDFA is created when the optical fiber core is pumped by a laser diode, for example, to a level at which amplification occurs. The gain level of the EDFA depends on an inversion level of erbium ions excited by the laser diode, also referred to as the optical pump.

To compensate for a loss of signal caused by an upstream fiber cut or equipment failure, the AGC loop in each optical amplifier downstream of the OADM is typically used with an optical pump control method. In the pump control method, the inversion level in the EDFA is typically adjusted to maintain constant gain using control electronics. An operating current of the laser diode pump is typically adjusted, thus changing the optical pump power. Alternatively, the laser diode current is constant and the optical pump power is adjusted with the use of a variable optical attenuator in an optical feedback loop.

Though the pump control method may be adequate to correct slow or small fluctuations in amplifier gain over time, it is inadequate to handle transient effects on surviving channels resulting from fiber cuts or equipment failure upstream from the amplifier. The response time of the AGC loop depends on the response time of the gain dynamics of the EDFA, which is unacceptably slow. In other words, the slow dynamics of EDFA, though advantageous in that the gain is subsequently undisturbed by the modulation of the transmission signal, pose a problem in the event of a fiber cut or equipment failure.

The pump control method is particularly inadequate in the case of the large channel count drop that occurs when there is a fiber cut or equipment failure in an optically amplified WDM network. Two problems arise in this case. In a WDM network, each channel of communication operates at a particular wavelength. A spectral power distribution as well as the optical power at the input to the downstream optical amplifier changes, therefore, when fiber cuts or equipment failures occur. First, the sudden large drop in optical input power to an amplifier downstream of the OADM cannot be accommodated by the pump control method due to the slow gain dynamics of the EDFA. The surviving channels will, therefore, experience much different gain during the transient duration from that before the optical input power change. Second, the large change in the spectral power distribution results in a large change of stimulated Raman scattering (SRS) induced spectrum tilt in the downstream transmission fiber not compensated for by the pump control method. This is especially true for dense WDM transmissions.

SRS is a scattering phenomena, which occurs as a result of an incident wave scattering in a medium so that the incident wave is partially deflected to a higher wavelength. In an optical fiber supporting multiple wavelength-specific channels, energy from the channel with the lowest wavelength scatters into a next higher wavelength channel and so on. The result of this scattering phenomena is inter-channel signal mixing and a progressive increase in perceived gain in higher wavelength channels, which contributes to a spectrum tilt in the transmitted WDM signal. The spectrum tilt is further amplified as the WDM signal is transmitted through additional amplifiers and fiber in the network.

The SRS induced spectrum tilt changes as a result of both the abrupt change in the spectral power distribution of the input signal and the total optical input power change. SRS is an extremely fast (on the order of sub-picosecond) process. Consequently, both the transient gain and SRS spectrum tilt change could cause transmission errors for the channels transmitted to a downstream optical fiber link and undesired protection switching in the optical network.

Inserting a fast variable optical attenuator (VOA) into a multi-stage optical amplifier has been proposed to compensate the SRS induced spectrum tilt change. The control speed of VOA, however, cannot match the spectrum tilt change and the algorithm to simultaneously control both the pump power and VOA is very complicated and inadequately slow.

A second conventional method that has been proposed for transient control is the filler laser control method. The filler laser control method is to inject one or several high-power single frequency laser signals into the WDM transmission band at an OADM node. The output power of each filler laser is then adjusted to compensate the input power change due to fiber cut or network node failure upstream. Each filler laser occupies one WDM wavelength slot that could have been occupied by a transmission channel. Using multiple filler lasers occupying several WDM wavelength slots, therefore, reduces transmission capacity. Further, any filler lasers used must be inserted and spectrally filtered out at every OADM node.

In addition, a filler laser needs special modulation to avoid the stimulated Brillouin scattering that typically occurs when injecting high-power laser signals into a fiber. Brillouin scattering is caused by the interaction of light with acoustic waves in a media, resulting in some backscattered optical radiation. In a fiber, the backscattered radiation is guided and can result in efficient energy conversion of the input laser signal to the backscattered wave. The phenomenon ultimately limits the maximum optical power that can be launched into the fiber. Moreover, inhomogeneous broadening of optical amplifiers and the resulting spectral hole burning can cause gain variations at the optical wavelength of the filler laser, additionally limiting the capability of the filler laser control technique. As a result, the filler laser control method is complicated, costly, inefficient, and requires a reduction of the total transmission capacity of the optical network.

In summary, these and other conventional methods which have been employed in an attempt to mitigate the transient effect are complex, costly, and largely incapable of error free performance.

There is a need, therefore, for simple, low-cost, and high-performance transient control in dynamic optical networks. Specifically, a method and apparatus are needed for suppressing the transient effect and the related inter-channel SRS induced spectrum tilt change in the surviving optical channels, caused by upstream fiber cut or equipment failure.

SUMMARY OF THE INVENTION

The present invention, which addresses the needs unmet by the prior art, relates to a simple, low-cost, high-performance method and apparatus for effectively suppressing the transient effect and the related inter-channel stimulated Raman scattering (SRS)-induced spectrum tilt induced by an upstream fiber cut or network node failure in the surviving optical channels of an optically amplified wavelength division multiplexing (WDM) network.

A node of an optically amplified wavelength division multiplexing network of the present invention connects at least one upstream optical fiber link to at least one downstream optical fiber link. The node includes a receiver amplifier, which receives an optical signal that includes optical channels from the at least one upstream optical fiber link. The receiver amplifier further includes at least one pump laser. The node further includes an optical add/drop multiplexing module adapted to at least one of drop some optical channels, pass through a remaining number of the optical channels, and add additional optical channels. The node additionally includes a transmitter amplifier, which amplifies the passed optical channels and the added optical channels, and an optical tap upstream of the receiver amplifier for monitoring an optical signal power. The receiver amplifier amplifies the optical signal during normal operation, and operates as a noise source generating an output noise power if a loss of signal from the at least one upstream optical fiber link is detected by the optical tap.

Preferably, the receiver amplifier includes circuitry to shut down the receiver amplifier after detecting the loss of signal.

Preferably, the at least one pump laser operates to increase the output noise power of the receiver amplifier once loss of signal is detected to a predetermined target level of output noise power. The node may include local data storage to store the predetermined target level of output noise power, a predetermined target level of pump power, and a corresponding calculated operating parameter needed to operate the at least one pump laser at the predetermined target level of pump power once the loss of signal is detected. The receiver amplifier may additionally comprise a feed forward control circuit to adjust the at least one pump laser to increase the output noise to the target level of output noise power in response to detecting the loss of signal. The feed forward control circuit extracts the predetermined target levels, pump power and operating parameter from the local data storage.

A method for controlling transients in a downstream optical fiber link caused by a loss of signal in an upstream optical fiber link in an optically amplified wavelength division multiplexing network includes the step of provisioning an optical add/drop multiplexing node. The node includes a receiver amplifier, an optical add/drop multiplexing module, and a transmitter amplifier. The receiver amplifier further includes at least one pump laser operating at a pump power. Provisioning includes configuring the OADM node to at least one of drop channels, pass through remaining channels, and add additional channels to an optical signal. The method further includes calculating a received signal power at the input of the transmitter amplifier from the passed channels before loss of signal followed by detecting the loss of signal upstream. Once the loss is detected, the receiver amplifier operates as a noise source.

The method may further include the steps of calculating a target level of output noise power and calculating a target level of pump power needed to pump the receiver amplifier to generate output noise power substantially equal to the target level of output noise power. The target level of output noise power is the output noise power from the receiver amplifier resulting in the input noise power being substantially equal to the received signal power at the transmitter amplifier before loss of signal. An operating parameter needed to achieve the target level of pump power is also calculated. In response to detecting loss of signal, the pump power is increased to the target level of pump power. The method may further include storing the calculated target levels of pump power, output noise power, and operating parameter for the receiver amplifier locally and using feed forward control circuitry to extract the stored values and to increase the output noise power to substantially equal the target level of output noise power in response to detecting the loss of signal.

The method may further include the step of slowly shutting down the receiver amplifier by slowly reducing the pump power after the step of detecting loss of signal, preferably at a speed much slower than a speed of response of control circuitry of the transmitter amplifier and other downstream amplifiers.

The target level of output noise is preferably calculated by adjusting the input noise power by a spectral filtering factor of the optical add/drop multiplexing module, and by a lower power conversion efficiency of the receiver amplifier after the loss of signal.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION

Figure 1:
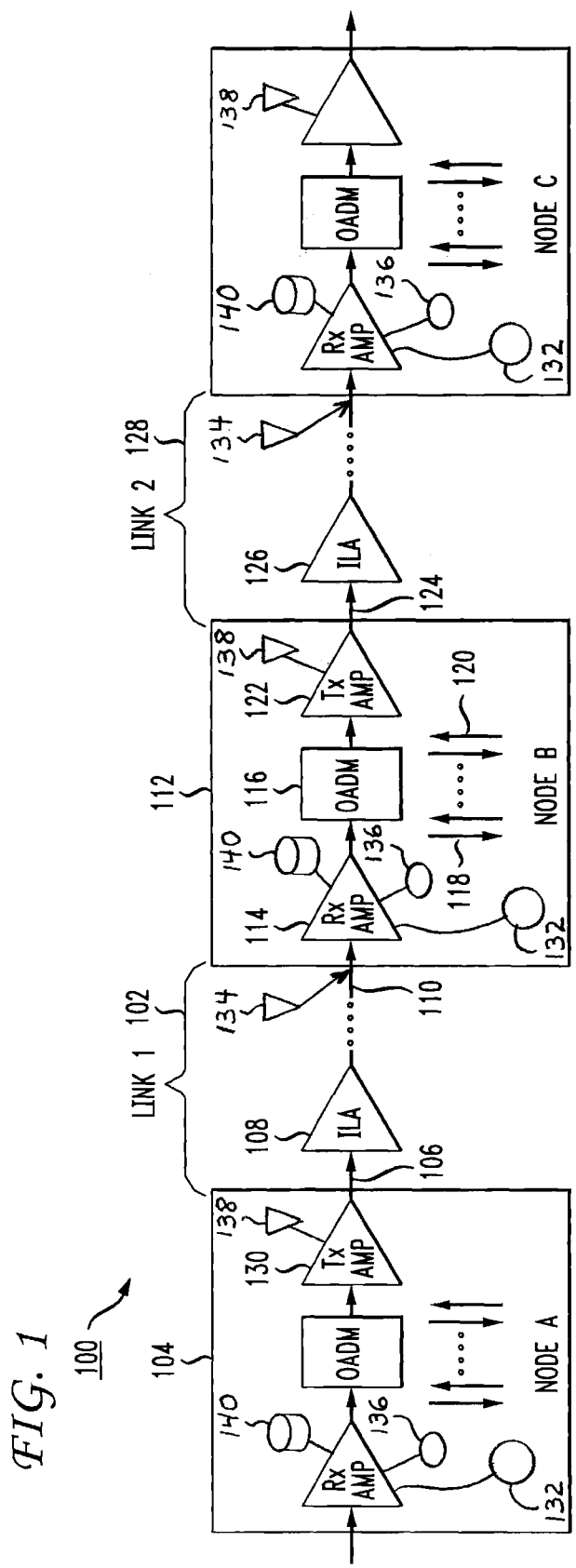
FIG. 1 is a block diagram of a section of an embodiment of an optically amplified wavelength division multiplexing network formed in accordance with the present invention.

FIG. 1 shows two links and three nodes of an optically amplified wavelength division multiplexing (WDM) network 100 in accordance with the present invention. A node, also referred to as an optical add/drop multiplexing (OADM) node includes at least one receiver amplifier, an OADM module, and at least one transmitter amplifier. A link according to the present invention includes an optical fiber connecting two nodes and may include in-line optical amplifiers. Only one direction is depicted in FIG. 1 and each of the nodes shown represents a simple two-degree optical add/drop multiplexing (OADM) in one embodiment of the present invention.

Each optical channel in the WDM network is centered at a particular wavelength. The OADM module operates to drop, pass through, or add a channel according to its corresponding wavelength, or equivalently, its optical frequency. For example, for a channelized OADM with channel spacing of about 50 GHz, the corresponding bandwidth could be about 25 GHz. Therefore, OADM modules may have a spectral filtering effect on a broadband signal, e.g., noise.

The OADM module of the present invention may further include signal conditioning features such as channel pre-emphasizing and spectrum flattening, which are well-known to those skilled in the art.

The OADM module of the present invention is preferably able to be adjusted to allow a large amount of noise to pass through once a loss of signal (LOS) is detected. The OADM module may be chosen from a multitude of architectures available. It is to be understood that the method and apparatus of the present invention is not limited to any particular type of OADM module or node. On the contrary, the method and apparatus of the present invention are readily modified by one skilled in the art to accommodate any type of OADM module.

In addition, though not shown in FIG. 1, the optically amplified wavelength division multiplexing (WDM) network 100 formed in accordance with the present invention may also include end terminals, the end terminals including wavelength division multiplexing and de-multiplexing modules. The network 100 formed in accordance with the present invention may also include one or more back-to-back regeneration nodes, where optical transmission channels are de-multiplexed, optically-to-electrically and electrically-to-optically regenerated, and then multiplexed.

In Link 1 102, data-modulated WDM optical signals are launched from a Node A 104 into an optical fiber span 106, and may be further amplified by an in-line amplifier 108. There may be several in-line amplifiers in the optical fiber span 106 to amplify the WDM optical signals before the signals reach a last optical fiber span 110 before Node B 112. The WDM optical signals are amplified by a receiver amplifier 114 preferably in Node B 112. After the receiver amplifier 114, the WDM optical signals are preferably input to an OADM module 116. In the OADM module 116, one or multiple channels 118 may be dropped. The remainder of the channels from Link 1 102 are passed through the OADM module 116, and one or multiple channels 120 may be added. The remaining through channels and added channels are input to a downstream transmitter amplifier 122 preferably in Node B 112. After being boosted by the transmitter amplifier 122, all the remaining through and added channels are preferably launched into a downstream optical fiber span 124 and may be further amplified by a downstream in-line amplifier 126. The transmission process is repeated in Link 2 128 in a manner similar to that in Link 1 102.

The optical amplifiers within the optically amplified WDM network of the present invention may include erbium-doped fiber amplifiers (EDFAs), and Raman amplifiers. The Raman amplifiers include counter-propagating distributed Raman amplifiers, co-propagating Raman amplifiers and lumped Raman amplifiers, or any combination thereof.

Each optical amplifier in the WDM network is conventionally operating in an automatic gain control (AGC) mode: as an input power to the optical amplifier changes, the optical amplifier is regulated to keep constant gain by adjusting an operating current of at least one pump laser 132, for example, or by adjusting other operating parameters to alter pump power such as an attenuation of a variable optical attenuator in a feedback loop. However, the process for the amplifier to settle down (i.e., to reach a stable AGC mode of operation) due to input power change is quite slow, up to milliseconds or even minutes. The slow reaction time is a result of the relatively long lifetime of excited rare earth ions (e.g., Er 3+) used in most optical amplifiers, the limited speed of the amplifier gain control circuitry 138 and the typically complicated control algorithms required.

During the process of recovering from total loss of signal (LOS) due to a fiber cut or equipment failure upstream, the channels amplified by the downstream transmitter optical amplifier 122 may experience much different gain from that before the input power change. This process is referred to as a transient effect. Moreover, for dense WDM transmission with many optical channels, an inter-channel stimulated Raman scattering (SRS) induced spectrum tilting may be relatively strong. The SRS induced spectrum tilt can also change significantly and quickly (in the range of sub-pico-second) due to the fiber launching power change caused by the amplifiers' output power change. Consequently, if there is no compensation, both the transient and SRS tilt change may cause transmission errors for the remaining through channels and undesired protection switching for the added channels.

The conventional method to handle the total LOS due to fiber cut or equipment failure is to immediately shut down any in-line amplifiers in the upstream optical fiber link as well as the receiver amplifier in the node. The transient effect for the surviving, i.e., added channels, is then minimized using conventional methods, such as the two already discussed. The filler laser control method is used to inject filler laser signal at the OADM node, or the pump laser control method is used to maintain constant gain in the amplifiers downstream of the OADM module.

To overcome the drawbacks of the prior art approaches, the method and apparatus of the present invention offer a simple, fast, and very low cost approach. Referring to FIG. 1, when LOS is detected in Link 1 102, the receiver amplifier 114 is kept in operation and automatically becomes a noise source. Preferably, the pump power of the pump laser 132 which pumps the amplifier 114 is immediately increased to a predetermined target level. Operating the at least one pump laser 132 at the predetermined target level of pump power generates a predetermined target level of output noise power from the amplifier 114. By generating noise substantially equal to the target level of output noise power, the receiver amplifier 114 in the OADM node 112 compensates for the LOS at the input of downstream transmitter amplifier 122 due to upstream fiber cut or network equipment failure.

An output noise power from the receiver amplifier 114 with no input signal is known from design parameters of the receiver amplifier 114. If the pump power of the receiver amplifier 114 of the present invention can not be increased for some reason, there is preferably still a substantial amount of output noise power (depending on the OADM filtering effect) from the receiver amplifier 114 to arrive at the input of the downstream transmitter amplifier 122. The calculation of output noise power from design parameters of an optical amplifier is well-known to those skilled in the art. By proper design, therefore, one skilled in the art can design the receiver amplifier to operate optimally under normal operating conditions for a particular WDM network and OADM scheme, and to operate as a noise source generating a substantial amount of output noise power after LOS.

The receiver amplifier 114 formed in accordance with the present invention preferably has several decibels (dB) of extra pump power available beyond that needed for normal WDM transmission. The output noise power is preferably increased to the target level of output noise power by increasing the pump power of at least one pump laser 132 in a control loop of the amplifier 114. The receiver amplifier 114 is preferably a low power amplifier which can be pumped to a highly saturated regime once the pump power is increased by several dB. In operation during LOS, the receiver amplifier 114 preferably produces high output noise power when operating in the saturated regime and at a constant pump power.

The target level of the pump power is calculated from the target level of output noise power. The target level of output noise power is calculated by considering a provisioning of channels and spectral filtering due to the passband, for example, of the OADM module 116, and the lower power conversion efficiency of the receiver amplifier 114 for a noise input compared to a signal input.

The provisioning of channels is defined as the dropping of channels transmitted by the receiver amplifier 114, the passing of remaining through channels, and the adding of additional channels 120 to input to transmitter amplifier 122. A break in Link 1 102 will result in a decrease in signal at the input to transmitter amplifier 122 corresponding to a received signal power from the remaining through channels during normal operation. The manner in which the OADM handles dropping channels and passing remaining through channels, including spectral filtering for broadband noise, will be a factor in determining the target level of output noise. A spectral filtering factor is defined, therefore, for the particular OADM used in the WDM network according to the present invention. The spectral filtering factor will be determined by the filtering effect the particular OADM will have on broadband noise from the receiver amplifier 114 acting as a noise source after LOS.

In the case of a break in Link 1 102 resulting in loss of the remaining through channels, the target level of the pump power will be that needed to increase the output noise power generated by the receiver amplifier 114 after LOS to the target level of output noise. The target level of output power is preferably the output noise power needed to produce an input noise power at the transmitter amplifier 122 substantially equivalent to the received signal power at the amplifier 122 from the remaining through channels during normal operation. The target level of output noise therefore compensates the LOS due to upstream fiber cut or equipment failure at the input of downstream amplifier 122. The downstream transmitter amplifier 122 and in-line amplifiers 126, therefore, do not experience an input power change after LOS. Consequently, the transient effect and the SRS tilting change in the downstream amplifiers are completely suppressed.

The LOS is detected at an optical tap 134 placed in the upstream optical fiber link, which constantly monitors input signal power to the receiver amplifier 114 in the node. Preferably, the optical tap 134 is placed at the input of the receiver amplifier 114 in the node 112. Predetermined target levels of the pump power and the corresponding calculated operating parameters of the receiver amplifier required to achieve predetermined target levels of output noise are preferably stored in local data storage 140 for use in case of upstream fiber cut or equipment failure. These stored operating parameters allow fast feed forward control of the receiver amplifier 114.

The stored operating parameters of the receiver amplifier 114 required to achieve the target levels after LOS are preferably used in a one-step feed forward control loop. A feed forward control system is distinguished from a feedback system in that the feed forward control system response is based on measured input power (or loss thereof) to the optical amplifier, rather than on the measured output. In conjunction with stored parameters in the nature of a look-up table, the feed forward control system can then implement immediate adjustments to the amplifier operation in response to LOS. The response time of the fast feed forward control circuit 136 of the present invention is preferably less than about 10 microseconds to ensure error-free transmission for the surviving channels.

Since the predetermined target level of the pump power is calculated and stored after the channel provisioning in the node and before LOS, the one-step feed forward control coupled with a simple and fast control circuit 136 enables the entire control process to be advantageously very short (e.g., in a range of several to hundreds of microseconds) in comparison to conventional methods such as the pump control methods.

Figure 2:
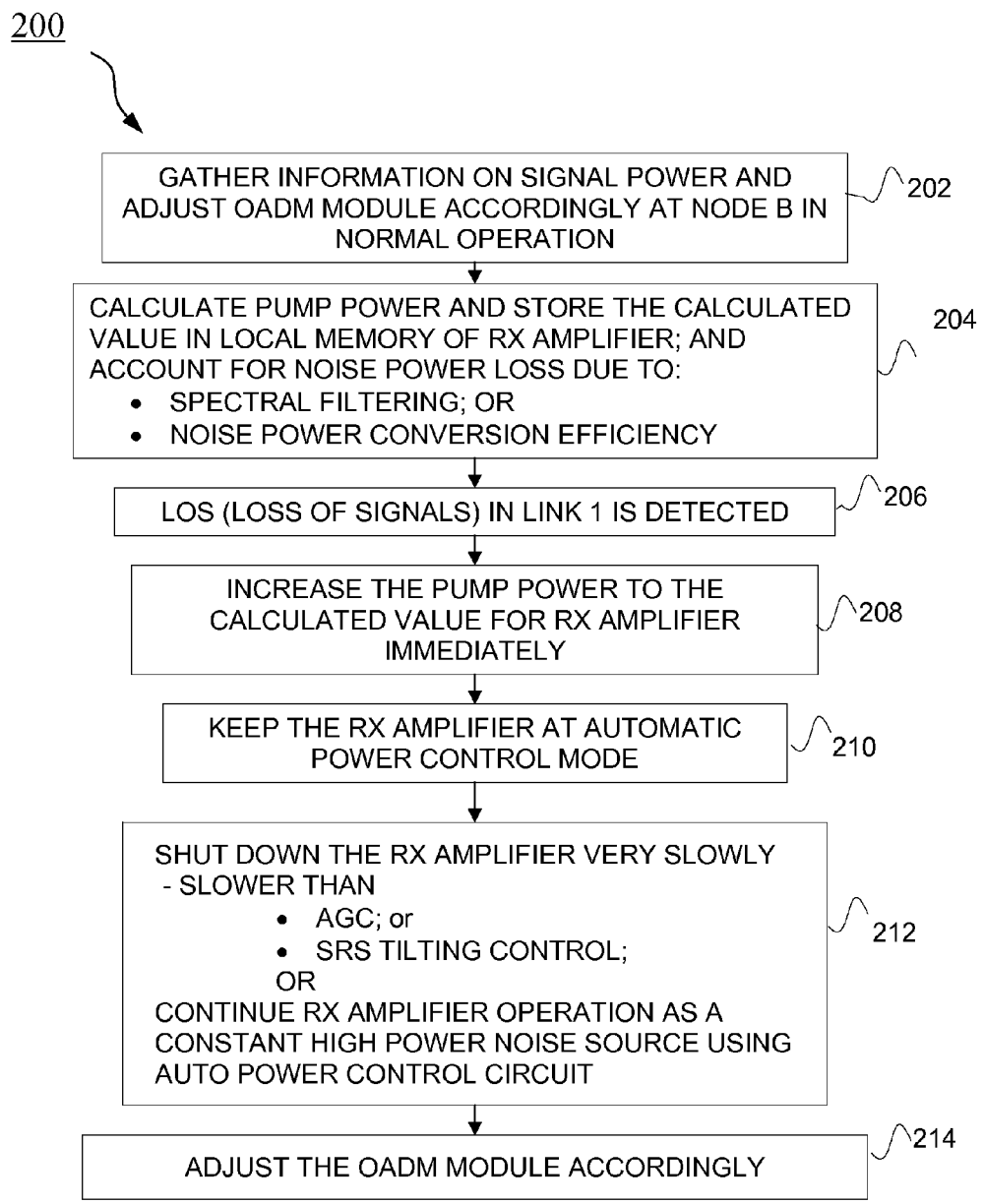
FIG. 2 is a flow chart of a method to suppress a transient effect in the network of FIG. 1 in accordance with the present invention.

The steps included in one embodiment of the method of the present invention are shown in FIG. 2. At step 202, each channel is provisioned and the received signal power from the remaining through channels at downstream transmitter 122 during normal operation is determined. The OADM module is also preferably adjusted so that noise generated from the receiver amplifier 114 in FIG. 1 acting as a noise source after LOS can pass through the OADM module as much as possible, without impacting normal operation of the OADM in passing remaining through and added channels. The OADM module is preferably adjusted before detecting the LOS in the embodiment represented by FIG. 2. At step 204, the predetermined target level of pump power is calculated. The target level of pump power corresponds to the target level of output noise power of the receiver amplifier 114 after LOS. The target level of output noise power is that noise level needed to compensate the input power drop at the downstream optical transmitter amplifier 122 due to loss of signal from Link 1 102. At step 204, the calculated values are also stored locally for the receiver amplifier 114. The calculations may take into account the noise power loss due to the spectral filtering of the OADM module 116. In addition, the slightly lower noise power conversion efficiency compared to signal power conversion for the receiver amplifier is preferably considered in the calculation. Calculating the target level of output noise power, therefore, includes first determining the input noise power corresponding to the received signal power at the transmitter amplifier. The step further preferably includes adjusting the input noise power by the spectral filtering factor and the noise power conversion efficiency to calculate the target level of output noise power of the receiver amplifier 114 after LOS.

At step 206, LOS is detected when there is fiber cut or equipment failure in Link 1 102. At step 208, the pump power of receiver amplifier 114 is immediately increased to the calculated value found in step 204 through fast feed forward control circuitry 136. The in-line amplifiers 108 in Link 1 102 and the transmitter amplifier 130 in Node A 104 may be shut down immediately once LOS is detected. At step 210, the receiver amplifier 114 is regulated as a constant noise source, in this embodiment, using an automatic power control mode in circuitry 136 to maintain constant noise power.

At step 212, the receiver amplifier 114 is shut down very slowly (in the range of milliseconds to minutes) after LOS preferably by slowly reducing the pump powers. Preferably, the pump powers are reduced after the transient effect from LOS has settled down, and network performance has stabilized. The speed at which shut down proceeds is preferably determined by the automatic gain control (AGC) speed and SRS tilting control speed for the downstream transmitter amplifier 122 and in-line amplifiers 126. Preferably, the speed of shutdown of the amplifier 114 is much slower than control circuitry 136 of downstream components. At step 214, the OADM module 116 is adjusted according to updated channel loading or provisioning configuration and/or to prepare to recover the network. Optionally, the receiver amplifier 114 may continue to operate as a high power noise source rather than be slowly shut down as in step 212 until other control steps or means of intervention are implemented.

Though in FIG. 1 and in the method described above, a simple two-degree OADM node is assumed, the method and apparatus according to the present invention are not limited to a particular configuration of the OADM node. For example, an embodiment of the present invention may include a multi-degree OADM node. The multi-degree OADM node may be a two-, three-, four- or n-degree node. Another embodiment of the present invention may include an optical cross-connection node.

Figure 3:
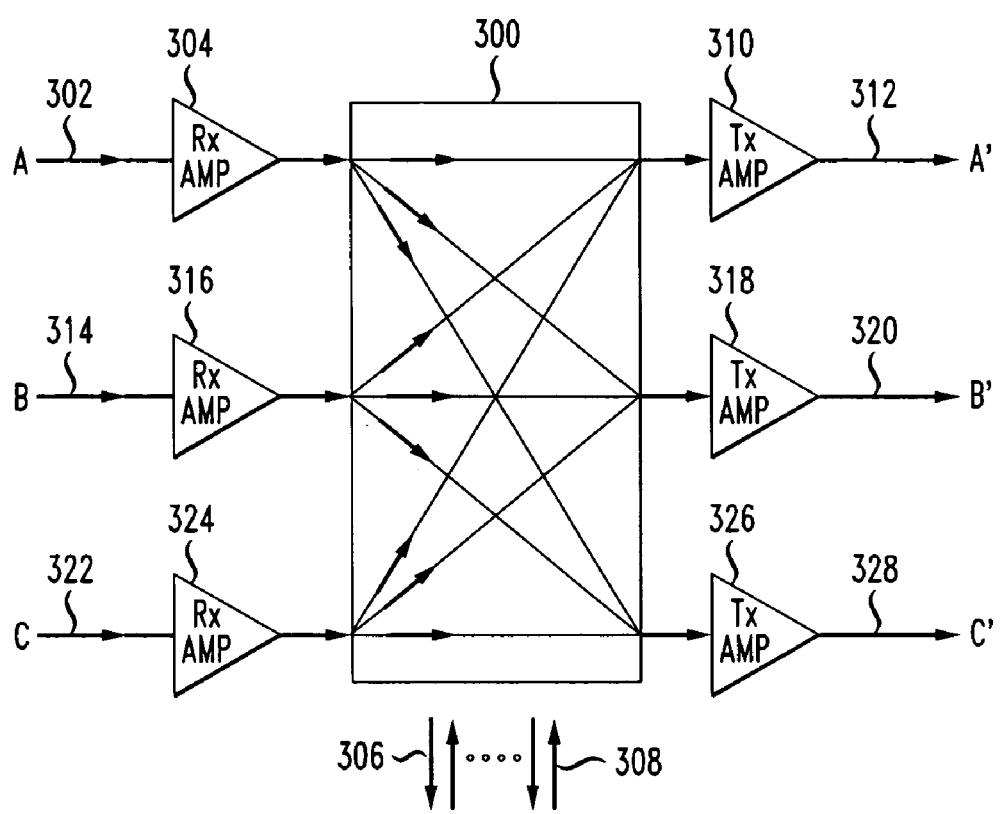
FIG. 3 is a block diagram of an embodiment of a node of the optically amplified wavelength division multiplexing network formed in accordance with the present invention.

A six-degree OADM node 300, which may be used in the WDM network formed in accordance with the present invention, is shown in FIG. 3. From direction A, WDM signals transmitted through an optical fiber link 302 are preferably amplified by a receiver amplifier 304. After amplification, some channels are dropped 306 in the OADM 300, some switched to direction A', some to B', and the rest to C'. The WDM signals from directions B and C may be amplified, dropped, and switched in a similar manner as those from direction A.

For the outgoing direction A', some channels are switched from direction A, some from B, some from C, and the rest are channels added 308 at the OADM 300. All the channels in direction A' are preferably boosted by a transmitter amplifier 310 and launched into transmission fiber 312. For the directions B' and C', the channels are switched, added, and amplified in a similar manner as those for direction A'.

If there is a fiber cut or network node failure in optical fiber link 302 in direction A, the receiver amplifier 304 is kept in operation as a high power noise source, and the control flow steps 202 to 214 directly apply. The control flow steps also apply for the fiber cut or network node failure in the directions B and C, and even for simultaneous failures in the directions (A+B), (B+C), (A+C), and (A+B+C). For example, if there is a fiber cut or network node failure in both optical fiber link 302 in direction A and optical fiber link 314 in direction B, then both receiver amplifier 304 and receiver amplifier 316 become noise sources and control flow steps 202 to 214 directly apply to each direction.

In the apparatus and method according to the present invention, therefore, the existing optical amplifier that normally operates to boost the WDM signal in the optical fiber link acts as an amplified noise source in the event of upstream fiber cut or equipment failure. The output noise of the optical amplifier after loss of signal compensates the power drop at the input of downstream optical amplifiers due to fiber cut or network equipment failure upstream. The method and apparatus of the present invention offer a very simple, low cost and fast solution to suppress the transient effects and SRS tilt changes, and are easily adapted to existing optical network equipment. In addition, service availability is improved by implementing the method and apparatus of the present invention in the WDM network.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A node of an optically amplified wavelength division multiplexing network, the node connecting at least one upstream optical fiber link to at least one downstream optical fiber link, comprising:

a receiver amplifier, the receiver amplifier receiving an optical signal comprising a plurality of optical channels from the at least one upstream optical fiber link, the receiver amplifier further comprising at least one pump laser;

an optical add/drop multiplexing module, the optical add/drop multiplexing module adapted to at least one of drop at least one of the plurality of optical channels, pass at least one of the plurality of optical channels, and add at least one of the plurality of optical channels;

a transmitter amplifier, the transmitter amplifier amplifying the at least one of the plurality of optical channels passed and the at least one of the plurality of optical channels added; and an optical tap upstream of the receiver amplifier, the optical tap monitoring an optical signal power, the receiver amplifier amplifying the optical signal during normal operation and operating as a noise source generating an output noise power in response to a loss of signal from the at least one upstream optical fiber link being detected by the optical tap, wherein the receiver amplifier comprises circuitry to shut down the receiver amplifier after detecting the loss of signal, wherein the at least one upstream optical fiber link provides an input signal to at least one downstream amplifier with gain control circuitry, the circuitry of the receiver amplifier being adapted to shut down the receiver amplifier at a speed less than a speed of response of the gain control circuitry of the at least one downstream amplifier.

2. The node of claim 1, wherein the gain control circuitry comprises an automatic gain control.

3. The node of claim 1, wherein the at least one pump laser is adapted to increase the output noise power of the receiver amplifier to a predetermined target level of output noise in response to the loss of signal being detected.

4. The node of claim 3, further comprising local data storage, the local data storage storing the predetermined target level of output noise power, a predetermined target level of pump power, and a corresponding calculated operating parameter needed to operate the at least one pump laser at the predetermined target level of pump power.

5. The node of claim 4, wherein the receiver amplifier comprises a feed forward control circuit, the feed forward control circuit adjusting the at least one pump laser to increase the output noise power to the predetermined target level of output noise in response to the loss of signal being detected, the feed forward control circuit extracting the predetermined target level of pump power and the corresponding calculated operating parameter from the local data storage.

6. The node of claim 3, wherein the predetermined target level of output noise is calculated by adjusting an input noise power by at least one of a spectral filtering factor of the optical add/drop multiplexing module and a noise power conversion efficiency of the receiver amplifier, wherein the input noise power is substantially equal to a received signal power at the transmitter amplifier from the at least one of the plurality of optical channels passed before loss of signal.

7. The node of claim 5, the feed forward control circuit comprising a response time of less than about ten microseconds.

8. The node of claim 1, wherein the at least one upstream optical fiber link comprises at least two upstream optical fiber links and the at least one downstream optical fiber link comprises at least two optical fiber links.

9. The node of claim 1, wherein the node comprises an optical cross-connection node.

10. The node of claim 1, wherein the at least one downstream optical fiber link comprises at least one in-line optical amplifier.

11. The node of claim 1, wherein the optical add/drop multiplexing module comprises signal conditioning features.

12. A method for controlling transients in a downstream optical fiber link caused by a loss of signal in an upstream optical fiber link of an optically amplified wavelength division multiplexing network, the method comprising the steps of:

provisioning an optical add/drop multiplexing node, the optical add/drop multiplexing node comprising a receiver amplifier, an optical add/drop multiplexing module, and a transmitter amplifier, the receiver amplifier comprising at least one pump laser operating at a pump power, provisioning comprising at least one of dropping at least one channel from an optical signal, passing through at least one channel, and adding at least one channel to the optical signal;

calculating a received signal power at an input of the transmitter amplifier from the at least one channel passed before a loss of signal;

detecting the loss of signal upstream of the receiver amplifier;

operating the receiver amplifier as a noise source generating an output noise power in response to the loss of signal, the receiver amplifier generating an input noise power at the transmitter amplifier;

calculating a corresponding operating parameter needed to operate the at least one pump laser at a target level of pump power needed to pump the receiver amplifier to generate the output noise power substantially equal to a target level of output noise power; and increasing a pump power of the at least one pump laser to the target level of pump power in response to detecting the loss of signal.

13. A method for controlling transients in a downstream optical fiber link caused by a loss of signal in an upstream optical fiber link of an optically amplified wavelength division multiplexing network, the method comprising the steps of:

provisioning an optical add/drop multiplexing node, the optical add/drop multiplexing node comprising a receiver amplifier, an optical add/drop multiplexing module, and a transmitter amplifier, the receiver amplifier comprising at least one pump laser operating at a pump power, provisioning comprising at least one of dropping at least one channel from an optical signal, passing through at least one channel, and adding at least one channel to the optical signal;

calculating a received signal power at an input of the transmitter amplifier from the at least one channel passed before a loss of signal;

detecting the loss of signal upstream of the receiver amplifier;

operating the receiver amplifier as a noise source generating an output noise power in response to the loss of signal, the receiver amplifier generating an input noise power at the transmitter amplifier;

calculating a target level of output noise power from the receiver amplifier, the target level of output noise power resulting in the input noise power at the transmitter amplifier after loss of signal being substantially equal to the received signal power before loss of signal;

calculating a target level of pump power needed to pump the receiver amplifier to generate the output noise power substantially equal to the target level of output noise power; and calculating a corresponding operating parameter needed to operate the at least one pump laser at the target level of pump power, wherein the steps of calculating the target level of output noise power, the target level of pump power, and the corresponding operating parameter are performed before the step of detecting the loss of signal; and increasing a pump power of the at least one pump laser to the target level of pump power in response to detecting the loss of signal.

14. The method according to claim 13, wherein the step of calculating the target level of output noise power comprises adjusting the input noise power by a spectral filtering factor of the optical add/drop multiplexing module, and by a lower power conversion efficiency after loss of signal of the receiver amplifier.

15. The method according to claim 13, further comprising storing the target level of pump power, the target level of output noise power and the corresponding operating parameter for the receiver amplifier locally before detecting the loss of signal.

16. The method according to claim 15, wherein the step of increasing the pump power of the at least one pump laser to the target level of pump power comprises using feed forward control circuitry to extract the stored target level of pump power and the corresponding operating parameter to increase the output noise power to substantially equal the target level of output noise power in response to detecting the loss of signal.

17. The method according to claim 13, further comprising the step of shutting down the receiver amplifier by reducing the pump power after the step of detecting the loss of signal.

18. The method according to claim 17, wherein the step of shutting down the receiver amplifier is performed at a speed substantially slower than a speed of response of one of an automatic gain control and stimulated Raman scattering induced tilting control speed of one of a downstream optical amplifier and the transmitter amplifier.

19. The method according to claim 12, further comprising the step of regulating the receiver amplifier as a constant high power noise source using an automatic power control circuit in response to detecting the loss of signal.

20. The method according to claim 12, wherein the step of detecting the loss of signal comprises tapping and monitoring the optical signal from the upstream optical fiber link.

21. The method according to claim 12, further comprising the step of adjusting the optical add/drop multiplexing module to pass a substantial amount of the output noise power from the receiver amplifier after loss of signal without impacting the at least one channel passed and the at least one channel added during normal operation before loss of signal.

22. A method for controlling transients in a downstream optical fiber link caused by a loss of signal in an upstream optical fiber link of an optically amplified wavelength division multiplexing network, the method comprising the steps of:
provisioning an optical add/drop multiplexing node, the optical add/drop multiplexing node comprising a receiver amplifier, an optical add/drop multiplexing module, and a transmitter amplifier, the receiver amplifier further comprising at least one pump laser operating at a pump power, provisioning comprises at least one of dropping a channel from an optical signal, passing through at least one channel, and adding at least one channel to the optical signal;
adjusting the optical add/drop multiplexing module to pass a substantial amount of an output noise power from the receiver amplifier after loss of signal without impacting transmission of at least one of the passed channel and the added channel during normal operation before the loss of signal;
calculating a received signal power at an input of the transmitter amplifier rom the at least one passed channel before the loss of signal;
calculating a target level of output noise power from the receiver amplifier, an output noise power substantially equal to the target level of output noise power resulting in an input noise power at the input of the transmitter amplifier after loss of signal substantially equal to the received signal power before the loss of signal;
calculating a target level of pump power needed to pump the receiver amplifier to generate an output noise power substantially equal to the target level of output noise power;
calculating a corresponding operating parameter needed to operate the at least one pump laser at the target level of pump power;
detecting the loss of signal upstream of the receiver amplifier;
operating the receiver amplifier as a noise source and generating output noise power in response to detecting the loss of signal; and
increasing the pump power of the at least one pump laser to the target level of pump power in response to detecting the loss of signal.

23. The method according to claim 22, wherein the step of calculating the target level of output noise power comprises adjusting the input noise power by at least one of a spectral filtering factor of the optical add/drop multiplexing module and a noise power conversion efficiency of the receiver amplifier.

24. The method according to claim 22, further comprising storing the target level of pump power, the target level of output noise power, and the corresponding operating parameter for the receiver amplifier locally, before the step of detecting the loss of signal.

25. The method according to claim 24, wherein the step of increasing the pump power of the at least one pump laser to the target level of pump power comprises using feed forward control circuitry to extract the stored target level of pump power and the target level of output noise, and to increase the output noise power to substantially equal the target level of output noise power in response to detecting the loss of signal.

26. The method according to claim 22, further comprising the step of shutting down the receiver amplifier by reducing the pump power after the step of detecting the loss of signal.

27. The method according to claim 26, wherein the step of shutting down the receiver amplifier is performed at a speed substantially slower than a speed of response of one of an automatic gain control and stimulated Raman scattering induced tilting control speed of one of a downstream optical amplifier and the transmitter amplifier.

28. The method according to claim 22, further comprising the step of regulating the receiver amplifier as a constant high power noise source using an automatic power control circuit after the step of detecting the loss of signal.

* * * * *

UNITED STATES PATENT AND TRADEMARK OFFICE
CERTIFICATE OF CORRECTION

| | |
|---|---|
| PATENT NO. | : 7,444,078 B1 |
| APPLICATION NO. | : 10/803062 |
| DATED | : October 28, 2008 |
| INVENTOR(S) | : Stango et al. |

It is certified that error appears in the above-identified patent and that said Letters Patent is hereby corrected as shown below:

IN THE PATENT:

Column 13, Line 55 Claim 22,   now reads "amplifier rom the at least one"

should read -- amplifier from the at least one --

Signed and Sealed this

Twelfth Day of May, 2009

JOHN DOLL
*Acting Director of the United States Patent and Trademark Office*